May 13, 1930.  W. L. DODGE  1,758,034
CURTAIN OPERATING MEANS
Filed July 3, 1928

Inventor.
William L. Dodge
by Heard Smith & Tennant.
Attys.

Patented May 13, 1930

1,758,034

UNITED STATES PATENT OFFICE

WILLIAM L. DODGE, OF DOVER, NEW HAMPSHIRE

CURTAIN-OPERATING MEANS

Application filed July 3, 1928. Serial No. 290,240.

This invention relates to curtain-operating means and the construction herein shown has been specially designed for the operation of the rear curtain of an automobile.

In driving automobiles at night the driver is often annoyed by the reflection from either the windshield or the rear-vision mirror of the headlights of an automobile in the rear and sometimes this reflection is such as to materially interfere with the proper operation of the automobile.

My present invention provides a novel construction by which the driver of the automobile can readily raise or lower the rear curtain, and it is so constructed that it can be inexpensively manufactured and can be applied to any curtain which is already installed in an automobile without removing the curtain. Furthermore, the construction is such that the curtain-operating means embodying my invention can be connected up with the curtain by anyone without the use of any special tools thus making it possible for every owner of an automobile to equip his car with a curtain-operating means at a very small expense.

In order to give an understanding of the invention I have illustrated in the drawings a selected embodiment thereof which will now be described after which the novel features will be pointed out in the appended claims.

Figure 1:
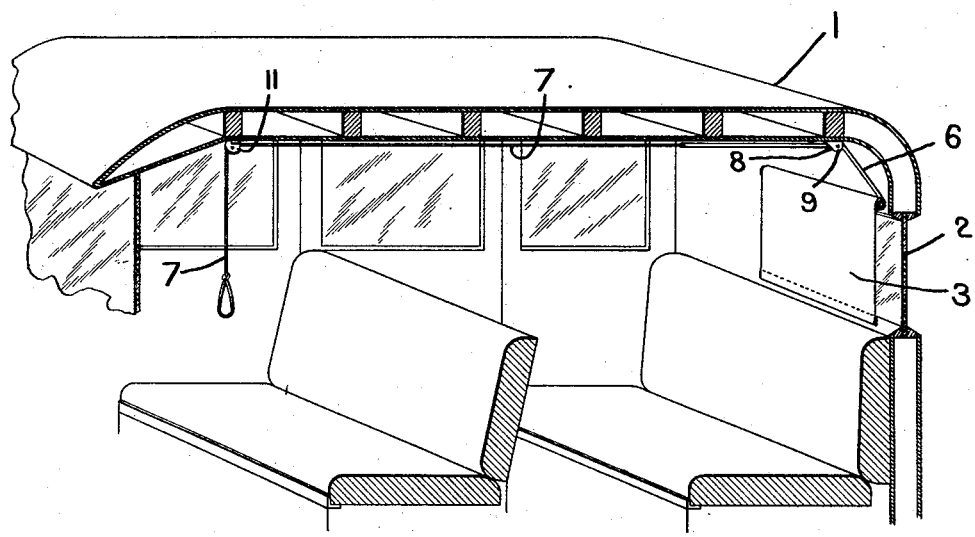
Fig. 1 is a sectional perspective view illustrating an automobile equipped with my invention.
Figure 2:
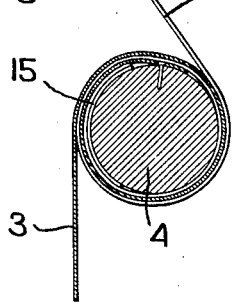
Fig. 2 is an enlarged section through the curtain roller showing the manner in which the tape 6 is wound thereon.
Figure 3:
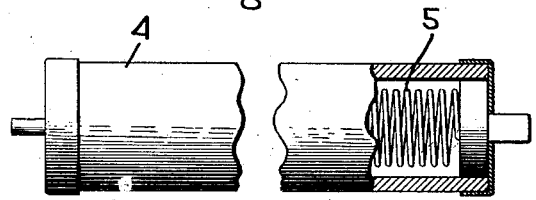
Fig. 3 is a view partly in section of the curtain roller.
Figure 4:
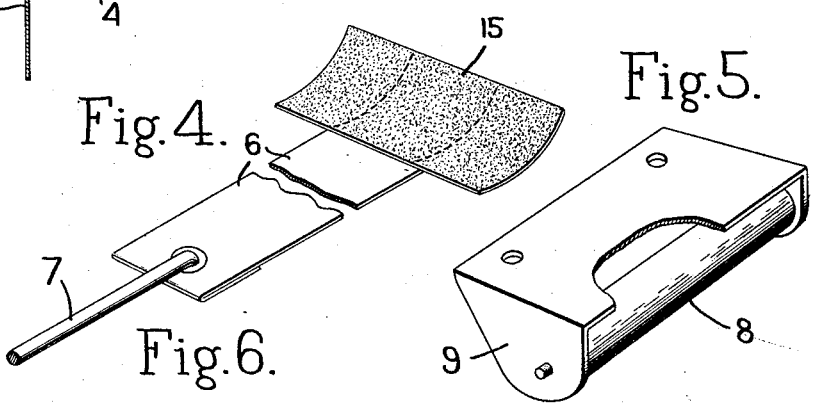
Fig. 4 is a fragmentary perspective view illustrating the actuating tape with the friction member.
Figure 5:
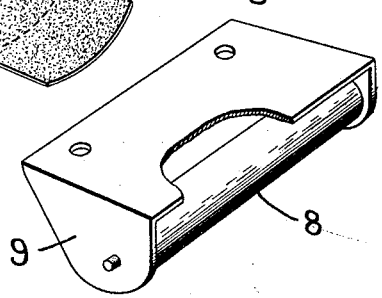
Fig. 5 is a perspective view with a part broken out illustrating the guide roll for the tape.

In the drawings 1 indicates generally an automobile having a rear window 2 and 3 is the usual curtain for the rear window, this being wound on a spring roller 4 of usual type having the usual spring 5 which tends normally to turn the roller in a direction to wind the curtain thereon.

My improved curtain-operating means comprises a flexible member wound on the roller 4 similarly to the curtain and extending to a point within convenient reach of the driver so that when a pulling strain is applied to the cord the roller 4 will be turned in a direction in opposition to the spring 5 thus allowing the curtain to be unrolled and freely depend therefrom. In the construction shown this flexible connection comprises a band or tape 6 which is rolled into the curtain and to which is attached an actuating cord 7 leading to a point within convenient reach of the driver. Since the band or tape 6 is rolled into the curtain and is then rolled onto the curtain roll with the curtain, a pull on the band 6 will unroll the curtain, as will be obvious, in the same way as a downward pull on the curtain itself.

The band 6 may be attached to the curtain or the curtain roll in any suitable way. In order to provide a structure which may be readily installed by anyone I propose to employ a friction member 15 which is secured to the end of the tape and which frictionally engages either the roll 4 or the curtain 3. This friction member 15 may be simply a piece of sand paper or emery paper or even a piece of felt, in fact any thin sheet material which has a friction surface.

In installing the device the curtain will be unrolled and the friction member 15 may be placed either directly against the roll 4 or between the turns of the curtain as it is rolled on the roller. When the curtain is rolled up this friction member 15 will be rolled into the curtain along with the tape and it will be held in place by its frictional engagement with the roll 4 or the curtain 3 so that it will not be pulled away from its engagement with the curtain by any pull thereon which is required to lower the curtain.

The band 6 is shown as passing over and being guided by a guide roller 8 which is carried by a bracket 9 that may be readily attached to the automobile in an appropriate position above the curtain and near the roof of the car and which has a length considerably greater than the width of the tape. The cord extends along the ceiling of the car to a point within convenient reach of the driver and at this point it passes over a combined guiding and locking roll 10 which is journalled in a bearing bracket 11 that is secured to the car ceiling. This locking roll 10 has the main groove 12 in which the cord operates and it has the spiral and cam-shaped locking groove 13 which leads off from the main groove at an angle. This locking groove 13 is so disposed that when the cord is being drawn forwardly, as would be the case when the curtain is being unrolled, there will be no tendency for the cord to run into the locking groove. When, however, the cord runs backwardly, as would be the case when the curtain is being rolled up, the cord will play freely over the pulley so long as it is held in the main groove 12 but if the cord is pulled to one side it will automatically run into the locking groove and because of the cam shape of the latter the cord will be jammed against the bracket and will thus be locked.

The curtain can be lowered by simply pulling on the cord 7, this operation turning the roll in a direction in opposition to the spring 5 and thereby allowing the curtain to be unwound from the roll. The tape 6, however, passes from the curtain roll up over the guiding roll 8, while the curtain naturally hangs suspended from the curtain roll. When the curtain has been lowered to the desired position the operator will pull the cord 7 sidewise and then release the tension on its sufficiently to allow the curtain to begin rolling up under the influence of the spring 5. As the roll 10 begins to turn backwardly the cord 6 will be automatically caught in the locking groove 13 and will be locked against further backward movement thereby locking the curtain in the lowered position.

Figure 6:
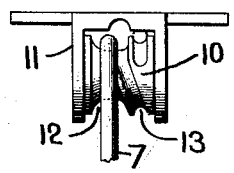
Fig. 6 is a view of the locking roll.

When it is desired to raise the curtain the operator simply pulls forwardly on the cord 6 sufficiently to unlock it and then moves it sidewise to bring it into line with the main groove 12 of the roll 10 and then releases the pull on the cord to allow the curtain to be rolled up. The advantage of using a flexible connection having a flat tape or ribbon shape at the end 6 where it is wound into the curtain is that the presence of this flat tape between the turns of the curtain does not injure the curtain or make an unsightly appearance as would be the case if a cord were used at this point. The advantage of having a cord at the end of the flexible connection adjacent the driver's seat is that the cord functions more satisfactorily with an automatic lock of the type shown in Fig. 6 than a tape would. Hence by having the flexible connection in the form of a tape at one end and a cord at the other both of these advantages are secured.

It will be noted that the guide roll 8 has a length greater than the width of the tape and the reason for this is to accommodate any traversing movement of the tape as it is being drawn over the roller without danger of said tape becoming jammed.

The device is extremely simple to manufacture and may be readily installed in an automobile and connected with the curtain by anyone and with only the use of a screw driver. When a device embodying this invention is installed in an automobile, therefore, the driver can easily and quickly control the rear curtain and can thus eliminate the danger which is a necessary incident to the reflection of bright headlights in the rear-vision mirror.

I claim:

1. In a device for operating the rear curtains of automobiles, the combination with a curtain roller, of a spring tending to turn said roller in one direction, a curtain so wound on the roller that the spring-impelled turning movement of the roller will wind the curtain thereon, a flat tape also wound on the roller between the turns of the curtain, means associated with the tape providing a frictional surface which has frictional engagement with the curtain so that the spring-impelled turning movement of the roller will wind the tape on said roller, and means accessible to the driver of the automobile to apply a pulling strain to said tape thereby to turn the roller in a direction to wind up the spring and allow the curtain to be unwound therefrom.

2. In a device for operating the rear curtains of automobiles, the combination with a spring roller, of a curtain wound thereon, a tape wound on the roller with the curtain, said tape having a friction member at its inner end which by frictional engagement with the roller and curtain retains the tape in its operative position, and an actuating cord connected to the tape and leading to within reach of the driver of the automobile.

3. In a device for operating the rear curtains of automobiles, the combination with a spring roller, of a curtain wound thereon, a tape wound on the roller with the curtain, said tape having at its inner end a friction member which is loosely received between the curtain and the roller and which by frictional engagement with the roller retains the tape in its operative position, and an actuating cord connected to the tape and leading to within reach of the driver of the automobile.

4. In a device for operating the rear curtains of automobiles, the combination with a spring roller, of a curtain wound thereon, a tape wound on the roller with the curtain, said tape having a friction member at its inner end which by frictional engagement with the roller and curtain retains the tape in its operative position, an actuating cord connected to the tape and leading to within reach of the driver of the automobile, and a cord lock by which the cord may be locked to hold the curtain at any desired elevation.

5. In a device for operating the rear curtains of automobiles, the combination with a curtain roller, of a spring tending to turn said roller in one direction, a curtain so wound on the roller that the spring-impelled turning movement thereof will wind the curtain thereon, a flexible curtain-operating member also wound on the roller between the turns of the curtain so that the spring-impelled turning movement of the roller will wind said member up on the roller, said member extending to within reach of the driver of the automobile, the portion of said curtain-operating member which is rolled on the roller being flat, means associated with said flat portion to provide a frictional surface which has sufficient frictional engagement with the curtain to retain the member in place as the curtain is raised and lowered and guiding elements by which said member is guided, whereby when a pulling strain is applied to said member the curtain roller will be turned in a direction to wind up the spring and allow the curtain to be unwound therefrom.

In testimony whereof, I have signed my name to this specification.

WILLIAM L. DODGE.